United States Patent Office 3,488,328
Patented Jan. 6, 1970

3,488,328
METHOD FOR THE SUSPENSION POLYMERIZATION OF VINYL CHLORIDE
Shunichi Koyanagi, Hajime Kitamura, Shigenobu Tajima, and Toshihide Shimizu, Niigata-ken, Japan, assignors to The Shin-Etsu Chemical Industry Co., Ltd., Tokyo, Japan
No Drawing. Filed May 31, 1967, Ser. No. 642,333
Claims priority, application Japan, May 30, 1966, 41/34,643
Int. Cl. C08f *1/11, 3/30*
U.S. Cl. 260—78.5                                    12 Claims

ABSTRACT OF THE DISCLOSURE

Suspension polymerization of vinyl chloride, or mixtures of vinyl chloride and vinyl monomers copolymerizable with vinyl chloride. The monomer is polymerized in an aqueous alkaline medium in the presence of a conventional suspending agent, a non-ionic surface-active agent and an organic solvent inert to the polymerization reaction. The presence of the suspending agent, the non-ionic surface-active agent and the organic solvent prevents adhesion of polymer scale to the inner wall of the polymerization vessel.

SUMMARY OF THE INVENTION

The invention generally relates to suspension polymerization and is particularly directed to suspension polymerization of vinyl chloride in an aqueous medium of alkaline pH value and containing a suspending agent. The term vinyl chloride as used herein is, for the purposes of this application, deemed to refer not only to monomeric vinyl chloride proper, but also includes monomeric mixtures of at least 50% of vinyl chloride with other vinyl monomers copolymerizable with vinyl chloride.

It has previously been suggested to suspension polymerize vinyl chloride in an aqueous medium which contains at least one suspending agent. A variety of suspending or suspension agents has been proposed for this purpose. It has thus been suggested to use water-soluble natural high molecular substances such as starch, gelatin, tragacanth gum and the like, water soluble cellulose derivatives such as alkylcellulose, hydroxyalkylcellulose and the like. Further, water soluble synthetic high molecular substances such as polyvinyl alcohol, polyacrylate, vinyl acetate maleic acid copolymer and the like, and water insoluble inorganic substance such as bentonite, talcum, barium sulfate, calcium carbonate and the like have been suggested. The suspension polymerization according to the prior art processes is carried out in the presence of an oil soluble polymerization initiator.

As is well known by those skilled in this art, suspension polymerization carried out with a suspension agent of the nature indicated above has a very serious drawback. This is so, because considerable amounts of polymer scale have a tendency to adhere to the inner wall surfaces of the reaction vessel. The removal of the polymer scale from the wall surfaces is very troublesome and time-consuming and seriously affects the operational efficiency of the procedure. The total output is thus considerably reduced by the formation of the scale. Further, granular impurities resulting from the scale are mixed with the polyvinylchloride product and reduce the over-all quality of the latter.

It is accordingly a primary object of the present invention to provide a process of suspension polymerizing vinyl chloride, which overcomes the prior art disadvantages and practice of which effectively prevents or minimizes the adhesion of polymer scale to the reactor wall surfaces.

Another object of the invention is to provide a process of the indicated kind which results in superior gelation and plasticizer absorption characteristics.

Generally, it is an object of the invention to improve on the art of suspension polymerizing vinyl chloride as presently practiced.

Briefly, and in accordance with this invention, the aqueous medium in which the suspension polymerization is carried out not only contains a conventional suspension agent, but also a non-ionic surface-active agent which serves as dispersing agent and an organic solvent which is inert to the polymerization reaction, the aqueous medium being maintained under alkaline conditions.

It has been ascertained that, calculated on the amount of monomer to be polymerized, the aqueous medium should contain the suspension agent, the non-ionic surface agent and the organic solvent in the following proportions:

Suspension agent: About 0.01–5% by weight. Non-ionic surface active agent: About 0.01–5% by weight and Organic solvent: About 0.5–20% by weight.

It has been ascertained that suspension polymerization in an alkaline aqueous medium of the indicated kind not only significantly reduces the amount of polymer scale formed on the inner surfaces of the polymerization vessel, but also considerably reduces the gelation and plasticizer absorption. In prior art processes of this kind the amount of polymer scale formed on the inner wall surfaces of the vessel is as high as 1.5 to 2.0 kg. with charges of 200 kg. of monomer. By contrast, no scale formation was observed in suspension polymerization carried out in accordance with the invention.

In our studies on the mechanism of polymer particle formation in the suspension polymerization of vinyl chloride, we thus found that the adhesion of polymer scale to the vessel wall is not only greatly reduced but in fact effectively prevented if the polymerization is carried out in the presence of a conventional suspension agent, a non-ionic surface-active agent and an inert organic solvent, the medium being maintained under alkaline conditions.

In respect to the suspension agent the substances previously referred to and known from the prior art can successfully be employed for the purposes of the present invention. It was found that particularly excellent results are obtained with water-soluble high molecular substances of the indicated nature in an amount of 0.01 to 5.0% by weight, the preferred range being 0.1 to 2% by weight, based on the amount of monomer to be polymerized.

Concerning the non-ionic surface-active agent with which the aqueous medium is enriched, a variety of compounds has been proved suitable for the inventive purposes. The following compounds may be mentioned as examples:

Polyoxyethylene alkyl ethers, polyoxyethylene alkyl esters, polyoxyethylene alkylaryl ethers, sorbitan alkyl ester, polyoxyethylene-propylene glycol ether, polyoxyethylene sorbitan alkyl ester, fatty acid monoglyceride and the like. The non-ionic surface-active agents may be used singly or in mixture. The preferred amount is 0.01 to 5.0% by weight based on the monomer to be polymerized. If amounts of less than 0.01% by weight of non-ionic surface-active agent are used, the particle size distribution of the polymer has a tendency to fluctuate over a wide range. Moreover, the particles have been a tendency to assume the shape of glass beads which, in turn, results in a deterioration of the plasticizer absorption and gelation characteristics. On the other hand, if the amount of non-ionic surface-active agent exceeds the 5% by weight value, the particle size of the polymer product has a tendency to become very large, which is undesired.

Referring now to the organic solvent used in the inventive process, it should be noted that any organic solvent may be employed as long as it is inert to the polymerization reaction. However, it has been ascertained that solvents with very high boiling points are less desirable since residues of the solvent have a tendency to remain in the polymer product after drying. Consequently, for the purposes of this invention, solvents of a boiling point of less than 200° C. are preferred. Such solvents are, for example, alkanols such as methanol, ethanol, propanol, butanol and the like; unsubstituted alkanes such as butane, pentane, hexane, heptane, and the like; arenes such as benzene, alkarene such as toluene, xylene and the like; alkyl ketones such as acetone, methyl ethyl ketone, methyl isopropyl ketone and the like; alkyl esters such as methyl, ethyl or butyl acetate, butyl formate and the like; alkyl ethers such as dimethyl ether, diethyl ether and the like; haloalkanes such as methyl chloride, methylene chloride, chloroform, carbon tetrachloride and the like. The solvents may be used singly or in mixture. The preferred amount of solvent in the aqueous medium is 0.5 to 20% by weight, calculated on the amount of monomer to be polymerized. If amounts of less than 0.5% by weight of solvent are used, the particle size distribution and the gelation and plasticizer absorption characteristics of the polymer are affected to an undesired extent. Further, the adhesion of polymer scale to the vessel walls is not sufficiently suppressed.

By contrast, if the solvent amounts exceed the 20% by weight value, no significant increase in the beneficial effect could be observed. Therefore, higher amounts of organic solvent would only render the process more expensive and would make it more difficult to remove residual solvent from the finished polymer product.

In order successfully to carry out the process according to this invention, it is necessary to maintain the polymerization system under alkaline conditions. The pH value of the system should preferably be above 9. A neutral or acidic polymerization system cannot prevent the adhesion of polymer scales to the wall of the polymerization vessel, even if the system contains a non-ionic dispersion agent and an organic solvent. With a view to maintaining the polymerization system in the alkaline range, a variety of alkaline substances may be added to the system. Suitable compounds for this purpose are, for example, sodium and potassium hydroxide, sodium and potassium carbonate, sodium acetate, sodium or potassium alcoholate, calcium hydroxide, ammonium hydroxide, sodium phosphate and the like. Normally, relatively small amounts of alkaline substance are sufficient to maintain the desired alkaline pH value. Thus, amounts corresponding to less than 1% by weight based on the monomer in the system are sufficient. Larger amounts of alkali should be avoided so as not to contaminate the final product with residual alkali.

The suspension polymerization process of this invention may be carried out in the same manner as conventional processes of the suspension polymerization type, except for the point mentioned above. As polymerization initiator, organic peroxide may be used, such as, for example, lauroyl-, benzoyl-, 2,4-dichlorobenzoyl- or acetyl-cyclohexyl-sulfonyl-peroxide; ter-butyl peroxy-pivarate, di-isopropyl-peroxy di-carbonate and the like and azo compounds such as $\alpha,\alpha'$-azobis-isobutylonitrile, $\alpha,\alpha'$-azobis-2,4-dimethyl varelonitrile and the like.

The suspension polymerization is advantageously carried out in a temperature range of 40 to 70° C.

In respect to pressure, the conventional pressure conditions and in this type of process for the suspension polymerization of vinyl chloride are suitable.

As previously set forth, the inventive process is applicable not only to the homo-polymerization of monomeric vinyl chloride, but also to the copolymerization of vinyl chloride with other vinyl monomers copolymerizable therewith. Such other suitable vinyl monomers are, for example, vinyl ester, vinyl ether, acrylic or methacrylic acid and their esters, maleic acid, aromatic vinyl compounds, vinylidene halide, olefins and the like. The vinyl chloride component in such mixtures should, however, preferably be at least 50% by weight.

The invention will now be described by several examples, it being understood, however, that these examples are given by way of illustration and not by way of limitation and that many changes may be effected without affecting in any way the scope and spirit of the invention as recited in the appended claims.

The test values in the examples were determined by the following procedures:

Gelation test

A mixing chamber of a volume of 50 cc. was fitted to a Brabender Plastograph. 30 g. of a mixture of the following composition was fed to the equipment (all parts in the following are parts by weight).

100 parts of polyvinyl chloride;
50 parts of dioctyl phthalate;
3 parts of tribasic lead sulfate; and
1 part of butyl stearate.

The mixture is stirred and heated at a speed of 1° C. per 3 minutes. The gelation temperature is the temperature at which the torque caused by the agitation is rapidly increased.

Plasticizer absorption test

A mixing chamber of 300 cc. volume is fitted to a Brabender Plastograph and the chamber jacket is kept at a temperature of 80° C. 100 g. of polyvinyl chloride maintained at a temperature of 80° C. for 30 minutes in an airbath is charged into the chamber. After 4 minutes, 50 g. of dioctyl phthalate is added under stirring while maintaining the same conditions in the chamber. The plasticizer absorption is indicated by the time in minutes required until the mixing torque caused by the agitation reaches a maximum.

Heat stability test 0.5 part of stearic acid and 1.5 parts of dibutyl tin maleate were added to 100 parts of polyvinyl chloride. The mixture is rolled at 170° C. for 10 minutes and compressed at a pressure of 200 kg./cm.$^2$ for 10 minutes into a 1 mm. thick sheet. This sheet is then heated in a Geer's oven at 190° C. The heat stability is indicated by the time in minutes required for changing the color of the sheet into black.

Example 1.—200 parts of vinyl chloride, 500 parts of water, 0.2 part of polyvinyl alcohol (saponification degree: 90 mole percent), 0.2 part of lauroyl peroxide and the dispersing agent and organic solvent as shown in Table I. are added to a polymerization vessel made of stainless steel and polymerized at 57° C. for 20 hrs. resulting in the values as shown in the following Table I:

organic solvent are added to carry out the polymerization resulting in the values as shown in Table IV.

TABLE I

| No. | Examples | | | | | Referential Examples | | | | | |
|---|---|---|---|---|---|---|---|---|---|---|---|
| | 1 | 2 | 3 | 4 | 5 | 1 | 2 | 3 | 4 | 5 | 6 |
| PH of aqueous phase | 12.5 | 12.5 | 12.5 | 12.5 | 12.5 | 5.7 | 5.7 | 5.7 | 12.5 | 12.5 | 12.5 |
| n-Hexane, percent by weight | 1 | 5 | 50 | 5 | 5 | | | 5 | | 0.1 | 5 |
| Sorbitan monolaurate, percent by weight | 0.1 | 0.1 | 0.1 | 0.1 | 0.05 | | 0.1 | | | 0.1 | |
| Amount of scale (g.) | | | | | | 1,500 | 2,000 | 1,600 | 1,700 | 50 | |
| Particle size distribution (passing rate, percent): | | | | | | | | | | | |
| 60 mesh | 95.6 | 96.9 | 95.6 | 96.9 | 96.9 | 92.3 | 45.2 | 90.8 | 93.5 | 60.3 | 88.1 |
| 100 mesh | 55.5 | 50.8 | 60.0 | 50.8 | 50.8 | 71.5 | 22.7 | 82.2 | 70.7 | 35.9 | 64.3 |
| 200 mesh | 0.8 | 0.6 | 1.0 | 0.6 | 0.6 | 2.2 | 8.3 | 24.5 | 5.6 | 2.8 | 6.0 |
| Gelation temp. (° C.) | 159 | 158 | 160 | 158 | 158 | 164 | 164 | 163 | >180 | 176 | 180 |
| Plasticizer absorption (min.) | 10 | 8 | 9 | 8 | 8 | 18 | 15 | 16 | >60 | 60 | 60 |
| Heat stability (min.) | 120 | 120 | 100 | 120 | 120 | 100 | 80 | 100 | 120 | 120 | 120 |

*Example II.*—200 parts vinyl chloride, 500 parts of water, 0.4 part of polyvinyl alcohol (saponification degree: 90 mole percent), 0.16 parts of lauroyl peroxide, 6 parts of n-hexane and 0.2 parts of sorbitan monolaurate are charged to the polymerization system, and the pH value of the mixture is adjusted to 11. Polymerization in the same polymerization vessel and reaction conditions as in Example I result in the following:

TABLE II

| No. | 6 | 7 | 8 | 9 |
|---|---|---|---|---|
| Alkaline compound | NaOH | Na₂CO₃ | CaO | KOH |
| Amount of scale (g.) | <50 | | | |
| Particle size distribution (passing rate percent): | | | | |
| 60 mesh | 100 | 100 | 100 | 100 |
| 100 mesh | 82.3 | 80.5 | 86.0 | 91.2 |
| 200 mesh | 4.5 | 3.9 | 5.5 | 6.9 |
| Gelation temp (° C.) | 158 | 157 | 159 | 156 |
| Plasticizer absorption (min.) | 6 | 7 | 8 | 6 |

*Example III.*—The same materials and reaction conditions as in Example II are employed for the polymerization, except that sorbitan monolaurate in Example II is substituted by other various non-ionic surface-active agents (0.3% by weight), resulting in the values as shown in the following table.

TABLE III

| No. | 10 | 11 | 12 | 13 | 14 |
|---|---|---|---|---|---|
| | Non-ionic surface-active agent | | | | |
| | Polyoxyethylene lauryl ether | Polyoxyethylene alkyl phenol ether | Polyoxyethylene sorbitan monostearate | Polyoxyethylene monostearate | Sorbitan distearate |
| (HLB) | (15.5) | (8.0) | (12.6) | (10.0) | (2.7) |
| Amount of scale (g.) | <50 | | <50 | | <50 |
| Particle size distribution (passing rate percent): | | | | | |
| 60 mesh | 99.5 | 95.1 | 96.6 | 94.9 | 95.5 |
| 100 mesh | 80.2 | 50.3 | 61.1 | 49.7 | 72.3 |
| 200 mesh | 1.8 | 0.8 | 1.2 | 0.6 | 2.0 |
| Gelation temp. (° C.) | 158 | 157 | 157 | 158 | 158 |
| Plasticizer absorption (min.) | 7 | 8 | 9 | 8 | 8 |

TABLE IV

| No. | 15 | 16 | 17 | 18 |
|---|---|---|---|---|
| Organic solvent | n-Butane | n-Heptane | Methanol | Methylene chloride |
| Amount of scale (g.) | <50 | | <50 | <50 |
| Particle size distribution (passing rate percent): | | | | |
| 60 mesh | 100 | 100 | 100 | 100 |
| 100 mesh | 77.7 | 81.1 | 70.3 | 62.5 |
| 200 mesh | 2.3 | 1.8 | 3.0 | 1.5 |
| Gelation temp. (° C.) | 158 | 156 | 150 | 154 |
| Plasticizer absorption (min.) | 10 | 10 | 9 | 8 |
| Heat stability (min.) | 120 | 120 | 100 | 100 |

While specific embodiments of the invention have been shown and described in detail to illustrate the application of the inventive principles, it will be understood that the invention may be embodied otherwise without departing from such principles.

What is claimed is:

1. In a process of suspension polymerizing vinyl chloride monomer in an aqueous medium containing a water soluble polymeric suspension agent, the improvement which comprises that the aqueous medium has an alkaline pH value above 9 and contains between about 0.01 to 5% by weight of a non-ionic surface-active agent and between about 0.5 to 20% by weight of an organic solvent inert to the polymerization reaction, said percentage values being based on the weight of monomeric vinyl chloride to be polymerized.

2. The improvement as claimed in claim 1, wherein the monomeric vinyl chloride to be polymerized is ad-

*Example IV.*—170 parts of vinyl chloride, 30 parts of vinyl acetate, 500 parts of water, 0.12 part of vinyl acetate-maleic acid copolymer, 0.04 part of methyl cellulose (viscosity of 2 wt. percent aqueous solution is 50 cps at 20° C.), 0.3 part of lauroyl peroxide and 0.04 part of sorbitan monolaurate (HLB 8.1) are charged into the reactor. NaOH is then added to render the pH value of the solution 11.8, and 6 parts of the respective mixed with vinyl monomer copolymerizable with vinyl chloride.

3. The improvement as claimed in claim 2, wherein the other vinyl monomer is at least one of vinyl ester, vinyl ether, acrylic or methacrylic acid and their esters, maleic acid, aromatic vinyl compounds, vinylidene halide, and olefine, the vinyl chloride in the mixture amounting to at least 50% by weight.

4. The improvement as claimed in claim 1, wherein said aqueous medium contains between about 0.01 to 5% by weight of said suspension agent.

5. The improvement as claimed in claim 4, wherein said suspension agent is at least one of starch, gelatin, tragacanth gum, alkylcellulose, hydroxyalkyl cellulose, polyvinyl alcohol, polyacrylate and vinyl acetate maleic acid copolymer.

6. The improvement as claimed in claim 1, wherein said non-ionic surface-active agent is at least one of polyoxyethylene alkyl aryl ether, sorbitan alkyl ester, polyoxyethylene alkyl aryl ether, sorbitan alkyl ester, polyoxyethylene sorbitan alkyl ester, polyoxyethylene-polypropylene glycol ether and fatty acid mono-glyceride.

7. The improvement as claimed in claim 1, wherein said organic solvent has a boiling point below 200 C.

8. The improvement as claimed in claim 7, wherein said organic solvent is an alkanol, alkane, arene, alkarene, alkyl ketone, alkyl ether or haloalkane.

9. The improvement as claimed in claim 8, wherein said organic solvent is at least one of methanol, ethanol, butanol, propanol, butane, pentane, hexane, heptane, benzene, toluene, xylene, acetone, methyl ethyl ketone, methyl isopropyl ketone, methyl acetate, ethyl acetate, butyl acetate, butyl formate, dimethyl ether, diethyl ether, methyl chloride, methylene chloride, chloroform and carbon tetrachloride.

10. The improvement as claimed in claim 1, wherein the alkalinity of the aqueous medium is obtained by adding thereto an alkaline substance, said alkaline substance being at least one of sodium hydroxide, potassium hydroxide, sodium carbonate, potassium carbonate, sodium acetate, alcoholate of alkali metal, calcium hydroxide, ammonia and sodium phosphate.

11. The improvement as claimed in claim 1, wherein the aqueous medium contains a polymerization initiator, said initiator being an organic peroxide or organic azo compound.

12. The improvement as claimed in claim 11, wherein said initiator is one of lauroyl peroxide, benzoyl peroxide, 2,4 - dichlorobenzoyl peroxide, acetyl - cyclo - hexylsulfonyl - peroxide, ter - butyl peroxy - pivarate, di - isopropyl - peroxy di - carbonate, $\alpha,\alpha'$ - azobis - isobutylonitrile and $\alpha,\alpha'$-azobis-2,4-dimethyl varelonitrile.

References Cited

UNITED STATES PATENTS

| | | | |
|---|---|---|---|
| 3,049,521 | 8/1962 | Burkholder | 260—87.1 |
| 3,166,534 | 1/1965 | Perrins | 260—78.5 XR |
| 3,205,204 | 9/1965 | Heckmaier et al. | 260—87.1 |
| 2,687,408 | 8/1954 | Grim | 260—87.7 XR |

JOSEPH L. SCHOFER, Primary Examiner

JOHN KIGHT, Assistant Examiner

U.S. Cl. X.R.

260—32.8, 33.2, 33.4, 33.6, 34.2, 86.3, 87.1, 87.5, 92.8